July 7, 1959  I. L. SHEPHERD  2,893,169
ORCHID PLANT HOLDER
Filed May 21, 1957

INVENTOR.
IRVING L. SHEPHERD
BY
Justin W. Macklin
ATTY

2,893,169

ORCHID PLANT HOLDER

Irving L. Shepherd, Elyria, Ohio

Application May 21, 1957, Serial No. 660,584

5 Claims. (Cl. 47—47)

This invention relates to a means particularly intended for supporting an orchid plant or the like in a pot, both during and after filling the pot with the root embracing and surrounding material, and which supporting means may continue to securely hold the plant in position permitting its unrestricted further growth, budding, and flowering.

At present it is common practice to place a porous or granular material in a layer at the bottom of a flower pot of selected size, and then while manually positioning the root and holding the plant in an upright position, a fibrous material is packed around the root and lower portions of the stems to provide the equivalent of soil for the orchid plant.

A widespread practice now includes the use of a ground bark, such as fir bark, as the essential or major portion of the filler or "soil" which promotes the growth of the plant. When firmly, although loosely, so packed, the material is insufficient to assure the plant being held in an upright position, and it is customary to thrust into the packed material a rigid supporting stick or rod to which the plant stalks may be tied. Additional supporting means reaching from the lip of the pot to the stalk or stems or to the stick or rod may be needed to maintain the upright position of the plant.

An entire potting operation consumes considerable time and requires care and skill.

An object of the present invention is to provide a unique, simple, cheaply manufactured root engaging and plant supporting device adapted to afford more firm and assured support and positioning for the root of the orchid plant, and which may include a simple, effective means for supporting a vertically extending wire or rod to which the stems may be hooked or tied.

A further object of the present invention is to so construct this device that it may be most conveniently handled and be so shaped as to facilitate very rapid packing of the ground fir-bark, or other mixture, forming the soil equivalent. The advantages attained permit placing of the plant in position and filling the pot to the desired amount with the root "soil," as well as the positioning of the upright rigid supporting staff or rod and the tying of the plant thereto, all with such facility that completing the potting of an individual plant may be accomplished in a matter of a minute or two, as compared to the present practice in which a skilled operator may complete the potting of only three to five plants an hour, for example.

A further object of this invention is to make the novel support for the plant and upright member of such configuration and construction that it may be manufactured of thermo-plastic material by injection molding at low cost and in quantities.

An advantage is that after the formation each holder is ready for immediate use, needing only to be assembled by a simple motion, and it has means for gripping the upright with a spring pressure, after its assembly with the support, by another simple step.

Other advantages attained thereby are the firmness of holding the plant through the long period of time required; the convenience of hooking or tying the plant to the upright; the simplifying of the packing of the root-growth material while preserving other facilities such as convenience of watering, handling and moving about.

A more specific object is to provide a special root or rhizome embracing wedge-like notch, the edges of which are so shaped as not to injure the rhizome portion, and which will permit the unrestricted branching out of the roots therefrom.

Other advantages will become apparent in the following specification which relates to the drawings, in which.

Figure 1:
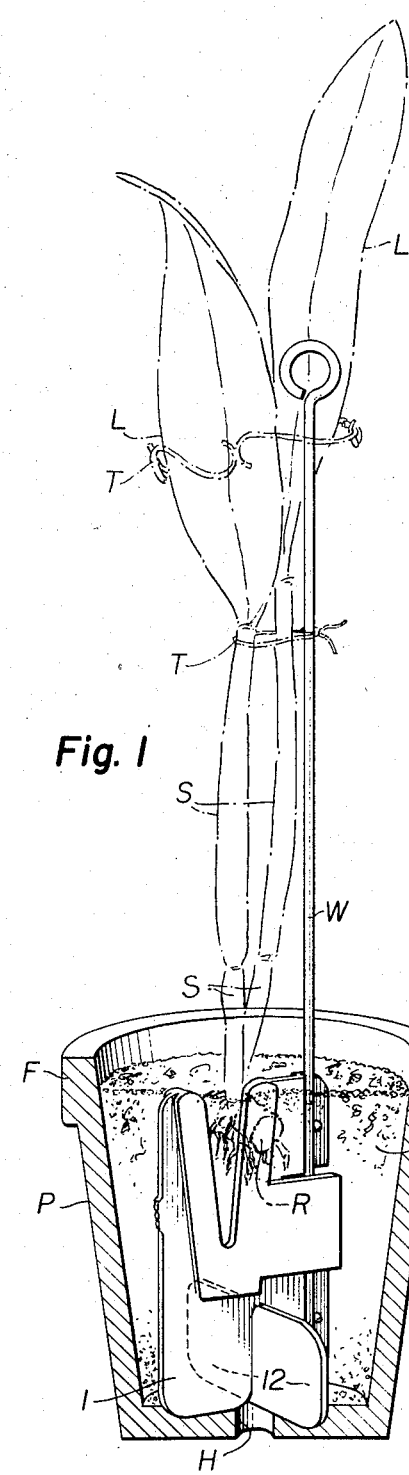
Fig. 1 is a perspective view of my plant holder, in a flower pot shown in section, and with the vertical support rising therefrom, the plant being illustrated in broken lines.
Figure 2:
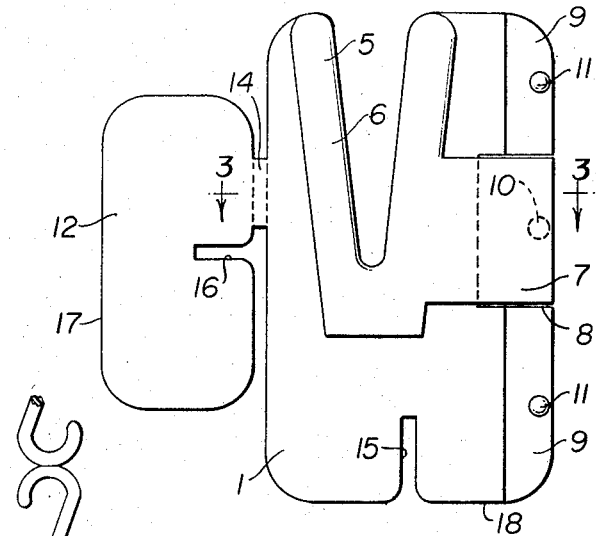
Fig. 2 is a side elevation of the holder as it is delivered from an injection mold cavity.

Referring to the drawings, the flower pot P has the usual thickened rim or flange F and drainage hole H in the bottom. The plant supporting device is shown in position in the flower pot with its rhizome R engaged thereby. The two stalks S, and pseudo bulbs S', and leaves L, as shown in Fig. 1, may be supported as shown by tying them as at T or T' to a rigid upright member W, as will more fully presently appear.

The material packed around the root and forming the equivalent of soil is indicated at B. This material substantially fills the pot, and the roots may grow into it unimpeded by the support.

The novel support proper is shown as comprising a flat plate-like member preferably somewhat longer than it is wide, the main area of which, indicated at 1, is of uniform thickness. At the upper portion is a root-engaging notch 5. The sides of the notch are rounded, and thickened material, integral with the plate-like member 1, extends each way, as at 6, from the notch. Within the plane of the thickened portion 6, at one side of the plate-like member, the material extends laterally, forming a tongue 7 substantially midway between the ends of the plate member and registering with a rectangular slot 8, while the edge portion of the member 1 is offset outwardly, as at 9, above and below the tongue.

The members 7 and 9 form gripping elements adapted to engage a wire or slender stick W (Fig. 1) which may be pressed into position by springing the tongue 7 and portions 9—9 to permit the member W to pass inwardly beyond the small knob 10 on the member 7 and knobs 11—11 on the gripping portions 9.

The plate and member portions 9—9 preferably have their corner portions rounded as shown, although this is not particularly related to the function of the device.

In the making of the portions described by injection molding, it is convenient to form a base wing 12 integral with the plate portion 1, and in the same plane and gated thereto by a thin gate connection 14. This gate connection may be readily broken by merely bending it laterally in a single motion with relation to the plane 1, as the first step in preparing the holder for placing it in the pot.

Figure 4:
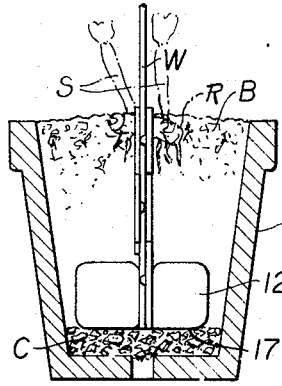
Fig. 4 is an elevation of the holder shown in position in a pot and supported on a porous layer at the bottom of the pot, the pot being shown in transverse section.

Formed in the lower part of the plate member 1 is a narrow parallel sided slot 15, and a similar slot 16 is formed in the wing member 12, so that when broken, the wing member may be tightly pressed into the slot 15 while the slot 16 embraces the adjacent portion of the member 1, bringing the outer or lower edge 17 of the wing into the same plane with the lower edge 18 of the plate 1. The combined depths of the slots 15 and 16, being equivalent to the width of the wing 12, permit the lower edge portions of the plate 1 and the edge 14 to rest upon the same plane when in position, as shown in Figs. 1 and 4. The width of these slots 15 and 16 is such as to cause a firm gripping of the surfaces inserted therein, thus the assembled plate 1 and the wing 12 form a rigid self-supporting unit.

Having broken or severed the wing 12 and assembled it as described, the wire or rod W may be sprung into position over the knobs 10 and 11, thus slightly spreading the tongue portions 7 and 9, and the material being resilient, the wire or rod is thus firmly gripped and may be permanently held in the upright position shown in Fig. 1.

Figure 5:
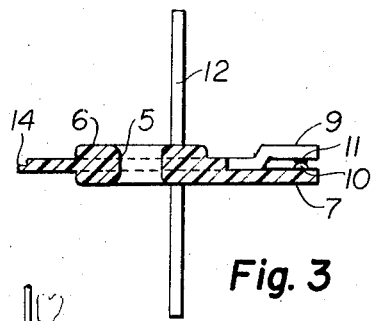
Fig. 5 is an illustration of a chain of molded plastic S-shaped hooks which may be used for tying the leaves and for spreading the stems.
Figure 3:
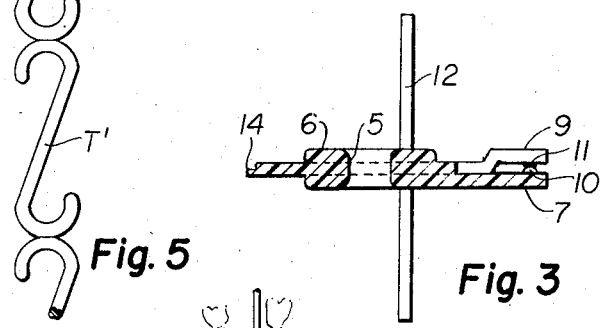
Fig. 3 is a section showing the cross wing support fitted in position, the plane of the section through the main part of the support being indicated by the lines 3—3 of Fig. 2.

The orchid plant, such as shown, with two stalks rising from a severed section of the rhizome, may have the rhizome portion R now gently pressed into the wedge notch 5. The stalks may be loosely tied to the upright wire or staff W in their substantially normal positions. Instead of using a string, flexible double hook members T', molded in interconnected form, shown in Fig. 5, may be used individually or in loops to connect the stalks and leaves to the rod W.

The support proper may now be set into a flower pot of the desired size, and the material forming the equivalent of root soil may be evenly distributed and gently packed around the sides of the support member 1 and the wing 12 and into close contact with the root portion R, while filling the flower pot to the desired height.

The plant support with its cross wing resting on the bottom of the flower pot is thus firmly set in position and is also additionally supported by the root receiving material, which may be a spongy moss or ground fir bark. The plant may then be safely handled and moved by lifting the pot with the plant and support therein.

A suitable label may be thrust into the material at one side where it will not interfere with growth, or a tag may be tied to the staff identifying the particular plant by species and special name, which is a very important requirement in the handling and growing of such plants as orchids.

Frequently, it is desirable to place a layer of very porous material, such as cracked flower pot particles, in the bottom of the flower pot, as indicated in Fig. 4 at C. The support may then be firmly seated on this layer of porous insoluble material, and the root-soil bark, or the like, may be packed above it and around the support as before. In either case, the normal drainage of water used for moistening the root-surrounding material may obviously pass outwardly through the hole H, while a desired amount of moisture is retained in the material B.

Obviously, it is desirable to avoid a toxic effect or deleterious chemical actions which may adversely affect the roots or the plant, such as oxidation of ferrous or other metallic wires or support material. By so designing my novel plant support as described, it may be produced in quantities by injection molding of resilient but rigid plastic material. I prefer to use a now well known high impact styrene, free from any plasticizer which might have a toxic effect on the roots of the plant. The vertical supporting staff or rod W may be formed of the same or similar non-toxic plastic material.

The ground bark soil-equivalent may be cedar bark, which has proven very satisfactory.

Having thus described my invention, what I claim is:

1. A device for supporting an orchid plant or the like in a pot while surrounded by material forming the equivalent of soil, said device comprising a substantially flat member, and laterally extending support elements at the lower part thereof, said member and support elements being adapted to rest on a flat surface, the upper portion of said member having an upwardly opening tapered recess adapted to receive and support the rhizome of a plant, and said member having resilient gripping means formed at one side thereof arranged to engage and support a vertically extending rigid rod member, and whereby the device with the vertical rod member in position may be seated in a flower pot and be surrounded by packed material forming the soil equivalent into which the roots may grow substantially unimpeded.

2. A device for supporting an orchid plant or the like in a pot while surrounded by material therein forming the equivalent of soil, said device comprising a substantially thin flat member of plastic material, and a transversely extending support at the lower part of said member, said member and support being adapted to contact and stand on a supporting surface, the upper portion of said flat member having an upwardly opening tapered recess, the side portions of which are thickened and shaped to form rounded edges adapted to receive and support the root portion of the palnt, and said member having means formed at one side thereof arranged to engage and support a vertically extending rigid small rod-like member to which the plant and stalk may be tied, when positioned in a flower pot.

3. A device for supporting a potted plant in position in the material forming the equivalent of soil while permitting freedom of growth of roots, said device comprising an upright element of thin rigid material having a lower edge shaped to rest upon a flat surface and having a transversely extending element adapted to contact the same surface and rigid with the first named-element said first-named element having an upwardly opening wedge-shaped notch adapted to embrace the root bulb or rhizome of a plant, and having resiliently relatively movable clamping means provided with knob-like projections for engaging a vertical slender rod to which the plant stalks may be tied.

4. The device defined in claim 3 in which the first-named element is formed of thin plastic material and is initially provided with a lateral extension forming a wing gated thereto and detachable from said thin rigid element, said wing when detached constituting said transversely extending element, said first-named element and said transverse element having notches adapted to tightly interfit whereby the wing element may be inserted and extend laterally from said upright element, and in which said gripping means constitute extensions at one side of the first-named element and form an offset spaced apart pair of resilient lips or fingers and an intermediate finger adapted to embrace the slender rod.

5. A molded thermo-plastic device for supporting a plant in a pot while surrounded by material forming soil equivalent for root growth, the device comprising a substantially flat thin plate-like member having an extended wing gated thereto by a thin connecting portion adapted to be broken for detaching the wing from the plate-like member, said plate-like member having a notch at one side to become the upper side for receiving the rhizome or root of a plant, and said wing and plate having co-acting interfitting notches permitting the detached wing to extend transversely and support the plate-like member in upright position, and said plate-like member having gripping finger-like portions formed at one side opposite the wing extension and adapted to grip and support a rod-like member in vertical position.

References Cited in the file of this patent

UNITED STATES PATENTS

| | | |
|---|---|---|
| 894,203 | Harvey | July 28, 1908 |
| 912,472 | Hart | Feb. 16, 1909 |
| 2,331,397 | Hummel | Oct. 12, 1943 |
| 2,680,497 | Miller | June 8, 1954 |
| 2,750,138 | Morris | June 12, 1956 |

FOREIGN PATENTS

| | | |
|---|---|---|
| 747,366 | Great Britain | Apr. 4, 1956 |